Patented Apr. 3, 1945

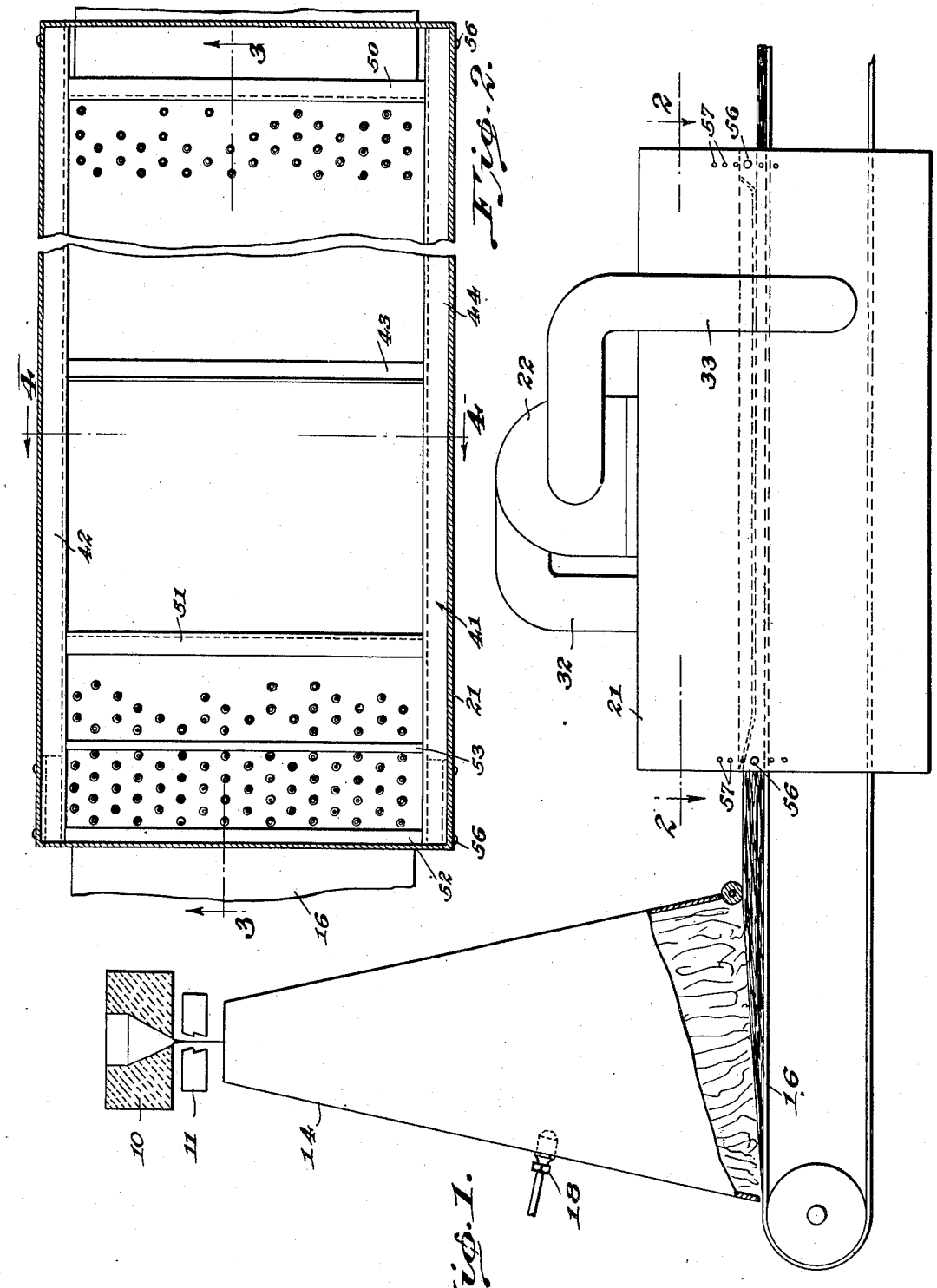

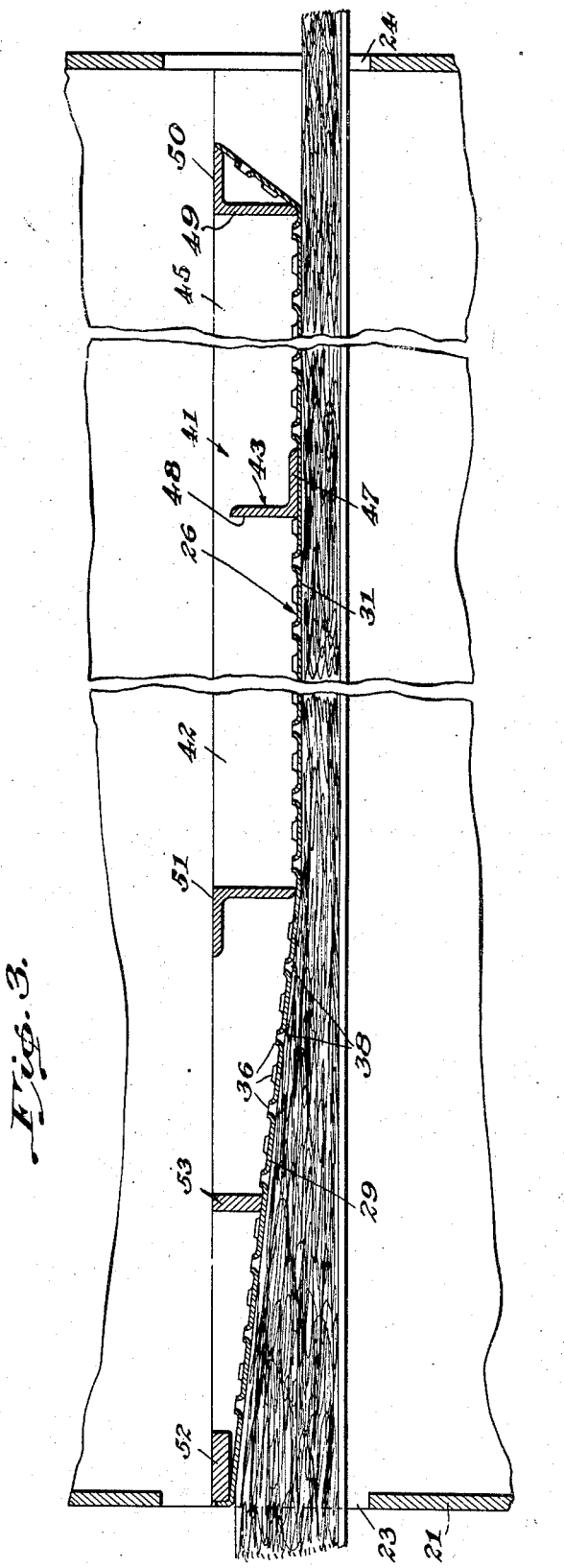

2,373,077

UNITED STATES PATENT OFFICE 2,373,077

APPARATUS FOR MANUFACTURING BONDED FIBROUS MATS

Dale Kleist, Newark, Ohio, assignor to Owens-Corning Fiberglas Corporation, a corporation of Delaware Application June 13, 1942, Serial No. 447,000

3 Claims. (Cl. 154—27)

This invention relates generally to apparatus for manufacturing bonded mats of fibrous material such as glass wool and refers more particularly to improvements in the equipment employed to set or cure a bonding agent incorporated with the fibrous material to form a mat of the proper thickness and density.

It has been proposed to heat treat a length of fibrous material in an oven between two endless conveyor belts or chains to set the binding material incorporated with the fibrous material. The conveyors extend for the full length of the heating chamber and are driven in such manner that the adjacent surfaces thereof travel in the same direction at the same speed. The spacing between adjacent surfaces of the conveyors is predetermined in dependence upon the desired thickness of the length of fibrous material to be produced, with the result that the fibrous mat is compressed to the desired thickness and the binder set up while the mat is advanced through the heating chamber.

In the equipment briefly described above trouble is often experienced with the conveyors and their complicated associated parts. This apparatus must operate at elevated temperatures and in the presence of abrasive particles of glass or other mineral material, making lubrication and protection of bearings and moving parts difficult. For these reasons the life of the conveyor chains is relatively short. The chains are ordinarily required to pass out of the oven at the ends thereof so that they transfer the heat from the oven to the outside air and are thus responsible for a large heat loss in the equipment.

It is an object of the present invention to improve this type of apparatus in a manner to remedy the defects heretofore existing. More specifically it is an object of the invention to eliminate one of the conveyor chains previously employed and provide, instead, a stationary means for holding the fibrous mat to required thickness while it is in the oven.

In accordance with the present invention, the stationary means comprises a planular surface adjustably mounted in the oven in selected spaced relation with a conveyor for a web of fibrous material. The surface coacts with the conveyor to hold the fibrous mat to desired thickness as it is moved thereacross by the conveyor, and is fashioned to enable the application of heat to the fibrous material and the binder thereon throughout the thickness of the mass.

Fibrous bonded mats that have been compressed between chain belts have rough surfaces due to the impressions made by the chain links. Also, fibers of the mat oftentimes project endwise from the surfaces of the mat into the spaces between the links so that the finished product may have a multiplicity of sharp fiber ends projecting from its surfaces, making handling of the product unpleasant and detracting from its appearance.

It is an object of the invention to provide means to smooth or iron one of the major surfaces of the mat during the time the binder is being cured. The resulting surface is very smooth and free from projecting fiber ends or other imperfections.

Still another object of this invention is to provide a plurality of perforations in the planular surface which cooperate with the foraminous conveyor to enable the circulation of a sufficient quantity of heating medium through the mat of fibers to set or cure the binding agent previously applied to the fibers; and further, to so shape the openings that there is a minimum of resistance to movement of the fibrous material over the surface.

A further object of this invention is to so arrange the planular surface relative to the conveyor that the mass of fibrous material moving into the oven is gradually compressed to the desired thickness and is held to this thickness until the binder has been sufficiently cured.

The foregoing, as well as other objects, will be made more apparent as this description proceeds, especially when considered in connection with the accompanying drawings wherein:

Figure 1 is a diagrammatic side elevational view of a heating chamber embodying my invention in connection with mineral fiber forming apparatus, partly in section;

Figure 2 is a horizontal sectional view taken on the line 2—2 of Figure 1, and partly broken away;

Figure 3 is an enlarged longitudinal sectional view taken in the plane of the line 3—3 of Figure 2 and partly broken away; and, Figure 4 is an enlarged sectional view taken in the plane of the line 4—4 of Figure 2, and partly broken away.

Briefly, this invention is concerned with the manufacture of a continuous length of bonded fibrous material, such as glass wool, having a predetermined thickness and comprising a multitude of discrete fine fibers suitably bonded together as by a thermosetting binding material. In accordance with conventional practice a loosely felted mat of the fibers is treated with the binding agent such, for example, as phenol formaldehyde, and is passed through an elongated heating chamber and heat treated to cure or set up the binder.

Usually the heating chamber is closely associated with the fiber forming means and is adapted to receive the mat of fibers as it is conveyed away from the zone of deposition of the newly formed fibers. Fiber forming apparatus is illustrated diagrammatically in Figure 1 as comprising a feeder 10 for flowing molten glass in a plurality of small streams. A blower 11 is positioned beneath the feeder and adapted to direct gaseous blasts onto the streams to attenuate them and project the fibers thus formed through a hood 14 and onto a conveyor 16. As the fibers build up into a mat on the conveyor, a heat hardenable binding material is sprayed onto the mat by means of a spray head 18.

The mat of fibers is fed from the hood and through a heating chamber or oven 21 by the conveyor and is compressed to the proper thickness before or as it moves into the oven and is held at this thickness until the binder in the mat has set or hardened. The heating of the binder in the mat is most advantageously accomplished by passing heated gas through the mat. This may be accomplished by employing a blower 22 to circulate heated air through the oven, suitable heating means being provided to maintain the required temperature of the air.

In detail, the oven 21 is of substantial length having an entrant opening 23 at one end and having a delivery opening 24 at the opposite end. The conveyor 16 is preferably of the endless chain type and advances the mat of fibrous material from the deposition zone through the oven 21 from the entrant end of the latter to the delivery end and then delivers the heat treated material at a removed cutting and/or packing station.

The fibrous material introduced into the oven has a thickness substantially greater than the thickness of the finished product and is gradually compressed to the proper thickness and then held to this thickness throughout the length of the oven by a skid or plate 26. The skid is mounted in the oven and spaced above the top surface of the conveyor 16 a distance corresponding to the thickness of the finished mat. The forward end of the skid is inclined downwardly as at 29 from the advance end of the skid toward the top surface of the conveyor and this inclination is predetermined to gradually reduce the thickness of the mat of fibrous material as it is advanced by the conveyor. The remaining portion 31 of the skid extends parallel to the top surface of the conveyor and is spaced from the latter a distance approximating the thickness of the finished product.

In accordance with conventional practice the loosely matted material has been treated with a suitable binder such as phenol formaldehyde prior to being introduced into the oven and this binder is cured on the fibers while the mat is advanced through the oven. For this purpose a heating medium such as air is introduced into the oven through a passage 32 above the conveyor and skid, and exhausted from the lower portion of the oven through a passage 33. The heated air passes downwardly through the skid through a multiplicity of perforations 36 therein, through the fibrous material and through the foraminous conveyor 16. As a result, the fibers are thoroughly heated throughout the thickness of the mat and the binder on the fibers is uniformly cured or set. The downwardly directed heated air urges the mat against the conveyor, thus advantageously tending to lessen the friction between the upper surface of the mat and the skid.

The perforations 36 are formed in the skid by punching in an upward direction. This enables the edges of the perforations to be rounded as shown at 38 and avoids the formation of burs or other obstructions on the under surface of the plate which would disarrange or mar the top surface of the mat.

The skid is preferably formed of sheet metal and is secured in the oven in selected relation to the conveyor by a frame 41 having longitudinally extending side sills 42 in the form of angle bars. The side sills are joined in proper lateral spaced relationship by cross members 43 also in the form of angle bars having the opposite ends welded to the side sills 42.

The side sills 42 are supported in the relationship shown in Figure 4 with one flange 44 of each sill extending laterally outwardly and with the other flange 45 extending in a downward direction from the flange 44. The longitudinal edges of the skid are bent upwardly to form attaching flanges 46 which are welded or otherwise secured to the adjacent flanges 45 on the sills.

The cross members 43 are arranged in the manner shown in Figure 3 with one flange 47 of each cross member fixed to the skid and with the other flange 48 extending in an upward direction from the skid. Thus, the cross members 43 function to rigidly support the skid in addition to securing the side sills in place.

The cross member 49 at the delivery end of the oven is inverted as shown in Figure 3 and the extremity of the skid is bent in the manner shown in this figure to enable the free edge thereof to be secured to the top flange 50 of the cross member. It will also be noted from Figure 3 that the cross member 51 adjacent the entrant end of the plate is inverted and that the portion of the skid in advance of this cross member is inclined upwardly to the top surfaces of the sills. The forward end of the inclined portion of the plate is fixed to a relatively flat cross member 52 extending between the sills 42 and the intermediate portion of this inclined portion is reinforced by a cross member 53 having its ends respectively fixed to the sills 42.

The skid and associated frame 41 form a unit which may be readily secured in the oven in selected distance above the conveyor 16 by bolts 56 passing through the flanges of the sills 42 and received in selected openings 57 in the walls of the oven. The apparatus is adapted in this manner to turn out products of different thicknesses.

The replacement of the heretofore used second conveyor with a unit of the character described not only appreciably simplifies the apparatus by substantially reducing the number of parts but, in addition, provides for obtaining a superior product. As pointed out above, the bottom surface of the skid is perfectly smooth as compared to the surface of a conveyor and, accordingly, the adjacent surface of the fibrous material is smoothed during the curing operation. Moreover, the perforations through the plate may be distributed to control the penetration of the heating medium into the fibrous material and thereby obtain more uniform curing of the material.

Although described in connection with the use of a thermosetting binder, the present apparatus may also be used to produce fibrous mats bonded with other types of material such as thermoplastic substances, and to compact a mat of fibrous inorganic material as the material is softened by heating to elevated temperatures. Such adaptations and modifications incident thereto are to be included within the scope of the claims.

I claim:

1. In apparatus for manufacturing a mat of fibrous material, an elongated heating chamber having an entrant end and having a delivery end, a conveyor extending from one end of the chamber to the other for engaging one major face of a mat of glass fibers and advancing the mat through the chamber, and means for compressing the mat to the proper thickness as it is advanced through the chamber including a stationary plate fixedly supported directly adjacent to and in spaced relation with the conveyor to directly engage the opposite major face of the mat, said plate having a portion adjacent the delivery end of the chamber spaced above the conveyor a distance approximating the thickness of the finished mat of fibrous material to be produced and having a portion adjacent the entrant end which is inclined in a direction toward the conveyor relative to the direction of movement of the conveyor to gradually compress the fibrous mat as it is advanced by the conveyor.

2. In apparatus for manufacturing a mat of fibrous material, an elongated chamber having an entrant end and having a delivery end, an endless conveyor extending from one end of the chamber to the other for advancing a mat of fibers through the chamber and having a perforated supporting surface directly engaging the lower major face of the mat of fibers, means cooperating with the conveyor for gradually compressing the mat of fibers to the proper thickness as the mat is advanced through the chamber by the conveyor, said last named means comprising a plate secured in fixed relation in the chamber directly above the conveyor and in inclined relation thereto and directly engaging the upper major face of the mat to thereby gradually compress the mat as it is advanced by the conveyor, said plate having a plurality of perforations therethrough, and means for circulating a heating medium in a dwnward direction through the perforations in said plate and conveyor supporting surface to uniformly heat the fibers of said mat.

3. In apparatus for manufacturing a mat of fibrous material, an elongated chamber having an entrant end and a delivery end, a foraminous conveyor extending horizontally from one end of the chamber to the other for supporting a mat of fibers and advancing it through the chamber, and means for compressing the mat of fibers as it is advanced through the chamber by the conveyor including a stationary plate supported directly above the conveyor in fixed vertical relation thereto to engage the upper major face of the mat and having a plurality of closely spaced apertures therethrough, the walls of said perforations adjacent the mat-engaging face of said plate having rounded contours merging into the said face of the plate, the portion of said plate adjacent the entrant end of the chamber being inclined downwardly in the direction of travel of the conveyor to gradually compress the mat as it enters the chamber.

DALE KLEIST.